J. E. WELTON.
LOW SPEED PEDAL HOLDER FOR AUTOMOBILES.
APPLICATION FILED APR. 27, 1920.
1,436,842.
Patented Nov. 28, 1922.
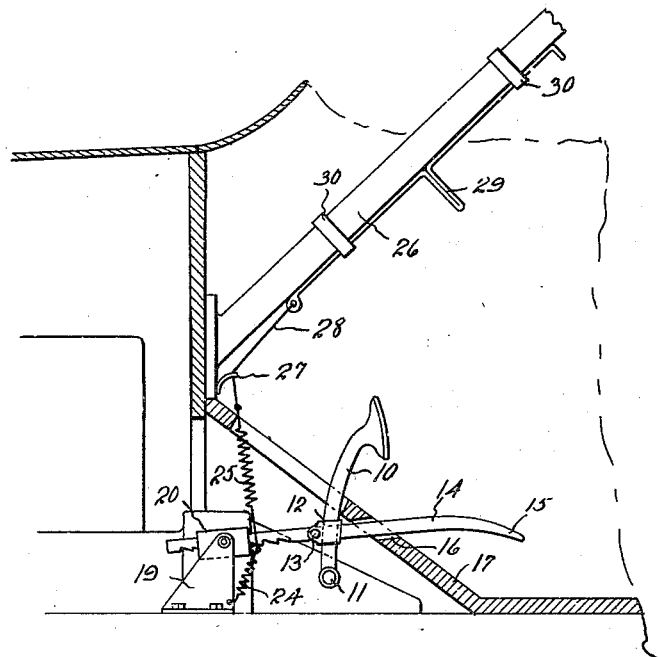
Fig. 1
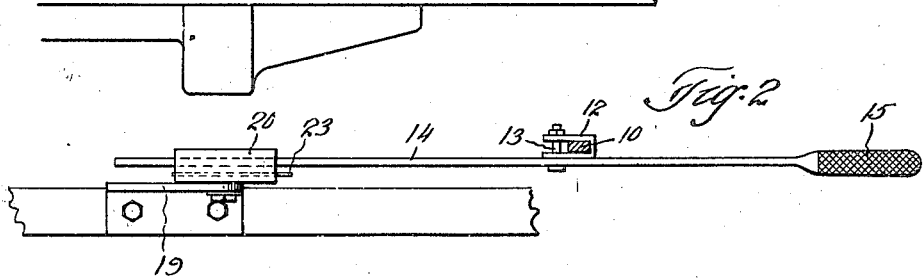
Fig. 2
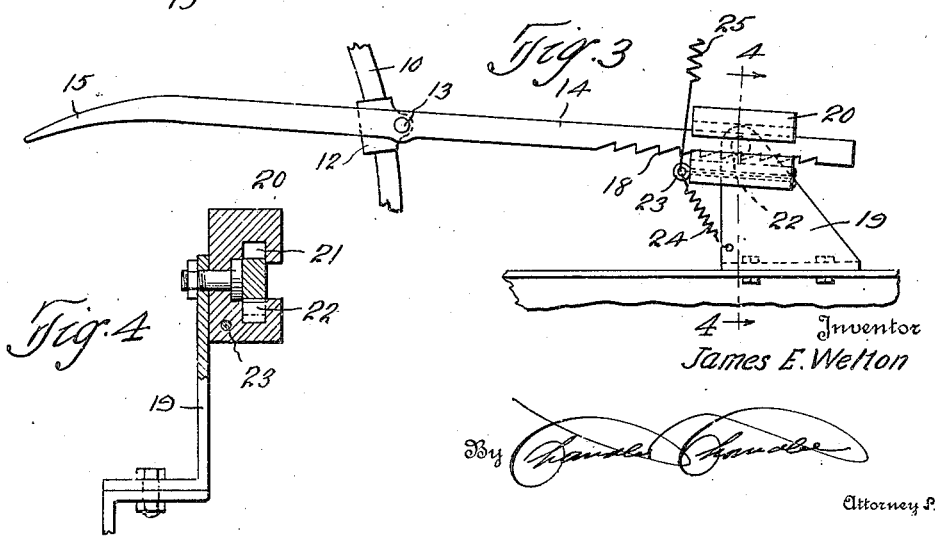
Fig. 3
Fig. 4
Inventor
James E. Welton
By [signature]
Attorney Patented Nov. 28, 1922.

1,436,842

UNITED STATES PATENT OFFICE.

JAMES E. WELTON, OF BRADFORD, VERMONT.

LOW-SPEED-PEDAL HOLDER FOR AUTOMOBILES.

Application filed April 27, 1920. Serial No. 376,970.

*To all whom it may concern:*

Be it known that I, JAMES E. WELTON, a citizen of the United States, residing at Bradford, in the county of Orange, State of Vermont, have invented certain new and useful Improvements in Low-Speed-Pedal Holders for Automobiles; and I do hereby declare the following to be a full, clear, and exact description of the invention, such as will enable others skilled in the art to which it appertains to make and use the same.

This invention relates to new and useful improvements in controlling devices for automobiles, and particularly to the low speed pedals of automobiles.

The principal object of the invention is to provide a novel and improved device for connection with the low speed pedal of an automobile by means of which said pedal can be easily set in the desired position and held in such position, for the purpose of relieving the operator from the necessity of holding his foot on the pedal.

Another object is to provide a novel and improved device of this character which is simple in construction, easy of operation, and which can be readily and quickly applied to automobiles which use planetary gears.

A further object is to provide a novel and improved device of this character which is readily capable of quick and easy release by the heel of the operator's foot, to permit the release of the pedal.

Other objects and advantages will be apparent from the following description when taken in connection with the accompanying drawing.

In the drawing:

Figure 1 is a side elevation of the invention in connection with the pedal, the surrounding portions of the automobile being shown in section.

Figure 2 is a top plan view of the same.

Figure 3 is an enlarged fragmentary side elevation of the sliding ratchet lever and the support therefor, viewed from the opposite side to that of Figure 1.

Figure 4 is an enlarged vertical sectional view taken centrally through Figure 3, on the line 4—4.

In the operation of automobiles of the type of the Ford, the driver sometimes wishes to travel at low speed, as when climbing a long hill. In such a case it is necessary for him to place his foot on the clutch pedal and hold the same in such position as will provide for the proper low speed. This is a very wearisome operation, as the foot must be held on the pedal for a long time. It is the particular object of the present invention to provide a novel and improved device, which is connected with the clutch pedal, whereby the operator can depress said pedal to the desired degree, and then remove his foot, thus leaving the pedal in the desired position until it is to be released or moved into another position for a different speed. The clutch pedal is normally held in rearward or elevated position by a spring, and when the driver depresses the pedal, it is done against the tension of the spring. As ordinarily constructed and arranged this pedal will immediately rise to normal elevated position when the foot is lifted therefrom.

Referring particularly to the accompanying drawing, 10 represents the clutch pedal in connection with which the invention is used. Clamped on the pedal 10, above its pivot 11, is a clip or yoke 12, and pivotally mounted on the pin 13, carried by the yoke, is a lever 14. This lever extends rearwardly of the pedal, through a slot 16, in the footboard 17, where it is provided with a foot-piece 15, and forwardly of the lever, where its lower edge is formed with a longitudinal series of ratchet teeth 18. A bracket 19 is secured on the chassis of the automobile, immediately forwardly of the dashboard, and pivotally mounted on this bracket is a rocking block 20. Formed longitudinally and horizontally through one side of this block 20 is a T-slot 21, in which the toothed portion of the lever 14 is slidably disposed. Secured transversely in the lower portion of the slot 21 of the block 20, is a single tooth 22 for engagement with the teeth of the lever 14. Disposed longitudinally through the lower portion of the block is a cotter pin 23, and connected to the rear or eye end of the pin are the inner ends of a pair of coil springs 24 and 25. The other end of the spring 24 is connected to the lower portion of the bracket 19, said spring normally urging the rear end of the block downwardly, and the forward end upwardly, whereby the single tooth 22 is forced into engagement with the teeth 18 of the lever 14.

Secured to the dashboard, at the point at which the steering column 26 passes through the dashboard, is a loop guide 27, and through this loop guide is slidably disposed a cord or wire 28. The lower end of the wire 28 is secured to the upper end of the spring 25 and extends longitudinally upwardly, beneath the steering column, and is connected to the sliding operating handle 29, mounted in the guide 30, on the lower side of the column, within easy reach of the driver.

Normally, the spring 24 rocks the block 20 into such position that its single tooth 22 engages with the teeth of the lever 14, and when the driver places his foot on the pedal 10 and presses the same forwardly to the desired degree to accomplish the engagement of the clutch whereby the speed of the automobile will be slow, the teeth of the lever 14 will engage with the tooth 22 and hold the lever or pedal 10 in such position, thus permitting the driver to take his foot from the pedal. The driver is thus relieved of the cramped and strained position of holding the pedal in the desired position for a great length of time. When, however, the driver simply presses the rear end of the lever 14 downwardly, with his heel the result is that the lever 14 will cause the rocking of the block 20 into such position that the teeth of the lever will be disengaged from the tooth of the block and the lever permitted to slide rearwardly through the T-slot of the block. The lever or pedal 10 is then in position to be further depressed or permitted to rise to normal or neutral position, according to the wishes of the driver.

If, however, the automobile is being driven within city limits, or in close quarters, the pedal lever 14 is disregarded, and in such cases the driver pulls upwardly on the wire 28, whereby the tension of the spring 25 is increased to such an extent as to overcome the tension of the spring 24, and rock the block into the proper position to permit the lever 14 to readily and easily slide through the slot of the block.

The parts are of simple construction, and are readily adaptable for easy attachment to the Ford automobile, or any other automobile having a similar gearing.

There is thus provided a novel and improved device whereby the driver is relieved of a generally tiresome and cramping operation, while driving at slow speed.

What is claimed is:

1. The combination with the low speed pedal of an automobile, of a lever movably mounted on the pedal and movable therewith, means for engagement with said lever to hold the pedal in shifted position, means for holding the holding means resiliently in engagement with the lever, and means for releasing the holding means.

2. The combination with the low speed pedal of an automobile, of a lever pivotally mounted on the side of the pedal, a support slidably receiving the forward end of the said lever, cooperating locking means on the lever and support for holding the lever in shifted position, and means for rocking the support to permit the lever to slide freely therethrough.

3. The combination with the low speed pedal of an automobile, of a lever pivotally mounted on one side of the pedal, above the pivot thereof, and extending forwardly and rearwardly thereof, a support mounted adjacent the forward end of the lever, a rocking block mounted on the support and having a longitudinal slot receiving the forward end of the lever therethrough, a single tooth in the slot of the block, the forward end of the lever being provided with teeth for interchangeable engagement with the single tooth, a spring connected to the block for normally rocking the latter to engage its single tooth with the teeth of the lever, and means operable from the steering column of the automobile for releasing the block from the lever.

In testimony whereof, I affix my signature, in the presence of two witnesses.

JAMES E. WELTON.

Witnesses:
W. F. DAVIS,
L. WESLEY DOE.